United States Patent [19]

Kardach et al.

[11] Patent Number: 5,274,826
[45] Date of Patent: Dec. 28, 1993

[54] TRANSPARENT SYSTEM INTERRUPTS WITH AUTOMATED INPUT/OUTPUT TRAP RESTART

[75] Inventors: James Kardach, San Jose; Cau Nguyen, Milpitas; Kameswaran Sivamani, Sunnyvale, all of Calif.

[73] Assignee: Intel Corporation, Santa Clara, Calif.

[21] Appl. No.: 53,960

[22] Filed: Apr. 26, 1993

Related U.S. Application Data

[63] Continuation of Ser. No. 753,107, Aug. 30, 1991, abandoned.

[51] Int. Cl.5 .................. G06F 9/46; G06F 12/14; G06F 13/24
[52] U.S. Cl. ..................... 395/725; 395/375; 395/425
[58] Field of Search ............. 364/DIG. 1, DIG. II; 395/725

[56] References Cited

U.S. PATENT DOCUMENTS

| 3,639,911 | 2/1972 | Frieband | 395/775 |
| 3,805,245 | 4/1974 | Brooks | 395/275 |
| 4,404,628 | 9/1983 | Angelo | 395/200 |
| 4,455,622 | 6/1984 | Loskorn | 395/275 |
| 4,644,494 | 2/1987 | Muller | 395/425 |
| 5,136,714 | 8/1992 | Brandaway | 395/725 |
| 5,175,853 | 12/1992 | Kardach et al. | 395/650 |

Primary Examiner—David Y. Eng
Attorney, Agent, or Firm—Blakely, Sokoloff, Taylor & Zafman

[57] ABSTRACT

A CPU of a microprocessor system is modified to post an executed write I/O instruction upon completion of writing by the bus unit. A dedicated memory area is provided for storing a customizable system interrupt service routine, program state data at the time of interruption and an I/O trap indicator indicating the CPU was interrupted during execution of an I/O instruction. The dedicated memory area is normally not mapped as part of the main memory space, thereby keep it inaccessible to the operating system and applications. An unmaskable system supervisor interrupt having higher priority than all other maskable and unmaskable interrupts is added to the CPU interrupts. A RESUME instruction is added to the CPU instructions to provide recovery of the CPU to the state before it was interrupted and continued execution including automatic re-execution of an interrupted I/O instruction. As a result, a system integrator or OEM may provide transparent system level interrupts with automated I/O trap restart that will operate reliably in any operating environment, and be relieved of the heavy burden of managing I/O trap restart.

14 Claims, 2 Drawing Sheets

TRANSPARENT SYSTEM INTERRUPTS WITH AUTOMATED INPUT/OUTPUT TRAP RESTART

This is a continuation of application Ser. No. 07/753,107, filed Aug. 30, 1991 now abandoned.

BACKGROUND OF THE INVENTION

1. Field of the Invention

The present invention relates to the field of microprocessor architecture. In particular, the present invention is a method and apparatus for providing transparent system interrupts with automated input/output trap restart.

2. Background

In U.S. Pat. Ser. No. 5,175,853, entitled Transparent System Interrupt, assigned to the assignee of the present invention, a method and apparatus for providing transparent system interrupts is disclosed, which has particular application to microprocessor architecture. The method and apparatus disclosed solves the problem inherent in prior art microprocessors, particularly those that have a protected mode as well as a real mode of operation, of the inability of a system integrator or original equipment manufacturer (OEM) to provide transparent system interrupts.

Transparent system interrupts are system-level interrupts that may not be relocated or overwritten by any operating system or application, thereby allowing a system integrator using the microprocessor to provide system-level interrupts that will operate reliably in any operating environment. Under the preferred embodiment disclosed in the above identified U.S. patent, a transparent system interrupt is invoked by the assertion of an electrical signal at an external pin of the central processing unit (CPU) chip of a microprocessor-based chip set.

Upon assertion of the electrical signal at the external pin of the CPU chip, the CPU maps a normally unmapped dedicated random access memory (RAM) area where the transparent system interrupt service routine is stored as a pre-determined area of the main memory space, saves the current CPU state into the dedicated RAM space, and begins execution of the transparent system interrupt service routine. The transparent system interrupt routine typically comprises instructions that are unique to a particular application of the transparent system interrupts to the system in which the CPU chip is installed. Recovery from the transparent system interrupt is accomplished upon recognition of an external event that invokes a "Resume" instruction causing the CPU to be restored to exactly the same state that existed prior to the transparent system interrupt.

An important application of the transparent system interrupts is to power management functions, whereby the processor and/or other system devices may be effectively shut down during periods of non-use and then restarted without the need to go through a power-up routine. This function is particularly useful in connection with battery-operated computers where power conservation is a primary concern. Thus, for example, if a computer operator is interrupted while working with an application program, the system may be powered down to conserve battery life. When the operator returns to use the system, it is restored to the same point in the application program as if the system had been running throughout the intervening period of time. The operator need not take any action to save application program results prior to the interruption, nor reload the application program when returning to use the computer.

Under the above indentified U.S. patent, the transparent system interrupt does not provide any specific support for interrupting the CPU during execution of an I/O instruction. Therefore, the transparent system service routine with application specific instructions has the responsibility for checking to determine if the CPU was interrupted during execution of an I/O instruction. If the CPU was interrupted during execution of an I/O instruction, the transparent system service routine has the further responsibility for determining which I/O instruction was interrupted, and fixing up the appropriate registers of the CPU state saved in the dedicated memory space, so that when the Resume instruction is executed to restore the CPU state, the CPU will re-execute the interrupted I/O instruction, if needed.

The manner in which a transparent system interrupt service routine can determine whether the CPU was interrupted during execution of an I/O instruction is microprocessor dependent and typically rather difficult. For the exemplary "i386 ™ SX" CPU based microprocessor system discussed in the above identified U.S. patent, the transparent system interrupt service routine first determines whether the CPU was interrupted during execution of an I/O instruction by searching through the user's memory space to determine if an I/O trap has occurred.

After determining an I/O trap has occurred, the transparent system interrupt service routine determines which I/O instruction was executed by determining where the instruction was located. To do so, the transparent system interrupt service routine has to determine the execution mode of the CPU, obtain the logical address, and translate the logical address into a physical address. Then, the transparent system interrupt service routine determines the interrupted I/O instruction's instruction type, instruction length, address length, and operand length. To do so, the transparent system interrupt service routine has to determine a number of parameters including the memory segment size, any address prefix override and opcode prefix override.

The approach of having the transparent system interrupt service routine be responsible for restarting the CPU from an interrupted I/O instruction has at least two disadvantages:

1) the heavy burden of re-starting the CPU to continue execution of an interrupted I/O instruction is placed on the transparent system interrupt service routine, and 2) the manner in which the CPU is restarted after it was interrupted from an I/O instruction is microprocessor dependent.

SUMMARY OF THE INVENTION

It is therefore an object of the present invention to provide an improved transparent system interrupt with automated I/O trap restart.

Under the present invention, the I/O write instructions are not posted. The central processing unit (CPU) waits until the bus unit has finished writing before executing the next instruction. A transparent system interrupt is invoked by the assertion of an electrical signal at an external pin of the central processing unit (CPU) chip of a microprocessor-based chip set. Upon assertion of the electrical signal at the external pin of the CPU chip, the CPU maps a normally unmapped dedicated random access memory (RAM) area where the transparent system interrupt service routine is stored as a pre-determined area of the main memory space, saves the current CPU state into the dedicated RAM space, and begins execution of the transparent system interrupt service routine.

The CPU state saved comprises an instruction pointer, a prior instruction pointer, and a plurality of I/O parameter registers. The transparent system interrupt service routine sets an I/O trap indicator in the dedicated RAM space, if the CPU is being interrupted during execution of an I/O instruction and the interrupt service routine wants the interrupted I/O instruction to be restarted, when execution resumes. The transparent system interrupt service routine typically comprises instructions that are unique to a particular application of the transparent system interrupts to the system in which the CPU chip is installed.

Recovery from the transparent system interrupt is accomplished upon recognition of an external event that invokes a "Resume" instruction causing the CPU to be restored to exactly the same state that existed prior to the transparent system interrupt including automatic re-execution of the interrupted I/O instruction. In particular, during restoration of the CPU state, the "Resume" instruction restores the instruction, and prior instruction pointers, checks the I/O trap indicator, and conditionally decrement the instruction pointer to the prior instruction pointer if the I/O trap indicator is set. Additionally, if the I/O trap indicator is set, the I/O parameter registers are restored to the appropriate general purpose registers. As a result, when the "Resume" instruction restarts the CPU to execute the "next" instruction, an interrupted I/O instruction will be re-executed automatically.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION

System Overview

Figure 1:
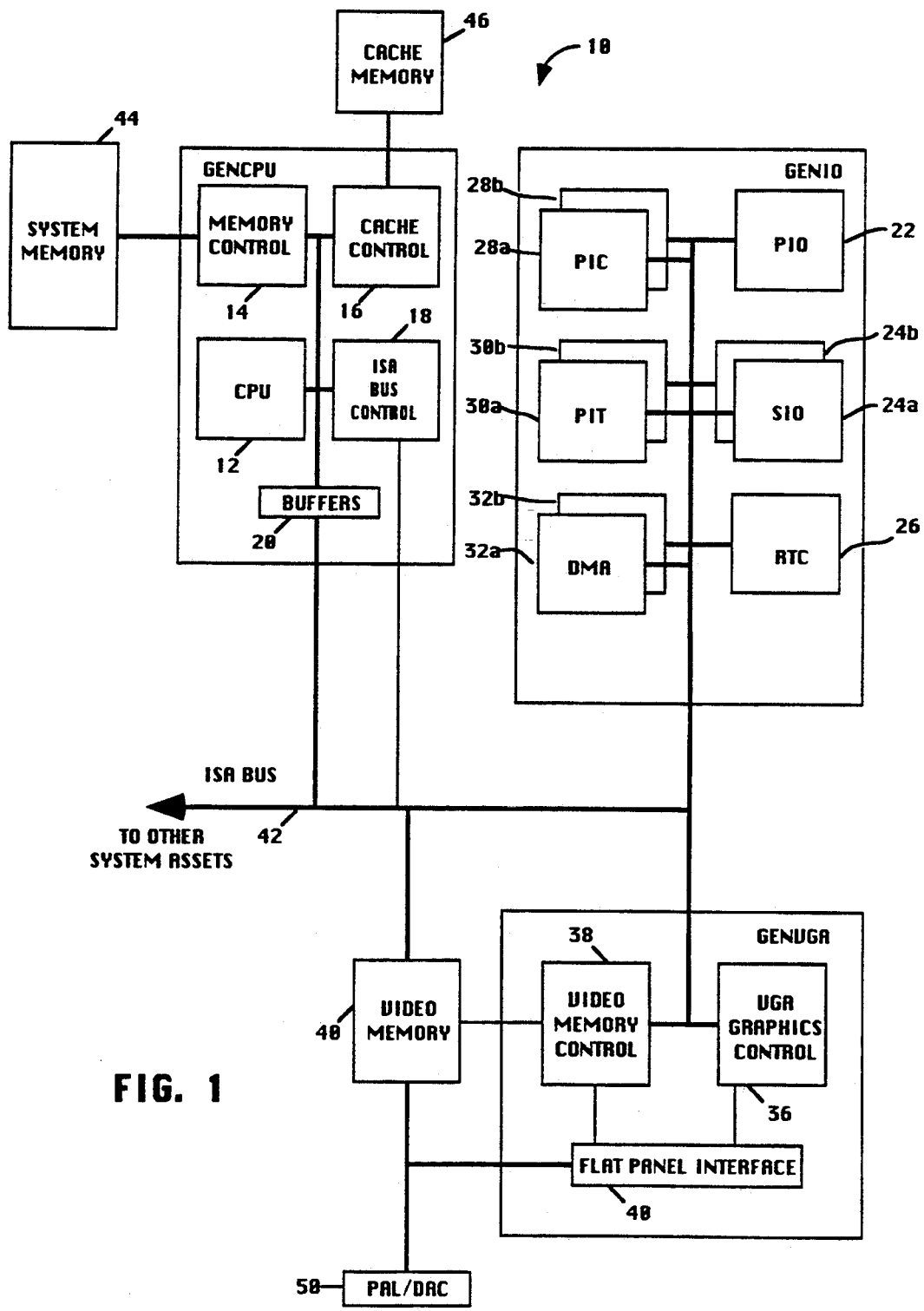
FIG. 1 is a functional block diagram of an exemplary microprocessor system embodying the present invention.

Referring now to FIG. 1, a block diagram illustrating an exemplary microprocessor system embodying the present invention is shown. The exemplary microprocessor system is briefly described below; however, it is to be understood that the present invention is not limited to this particular microprocessor design, and may be incorporated in virtually any processor design.

The exemplary microprocessor system 10 comprises three main components, designated as GENCPU, GENIO and GENVGA. GENCPU is an expanded central processing unit; GENIO is a single chip input/output unit; and GENVGA is a single chip graphics interface. The three components communicate with each other and with other system components (such as expansion slots, keyboard controller, disk controllers) via ISA bus 42.

GENCPU includes a CPU 12, a memory controller 14, a cache controller 16, ISA bus control logic 18 and line buffers 20. CPU 12 has at least two modes of operations, a real mode and a protected mode. CPU 12 is essentially a "i386 TM SX" CPU manufactured by Intel Corporation, the corporate assignee of this invention. Throughout this description, certain terminology relating to the "i386 TM SX" CPU, such as register names, signal nomenclature, is employed to described the present invention. Such terminology is understood by practitioners in the field of microprocessor design and will therefore not be explained at length herein.

In particular, CPU 12 comprises a plurality of general registers (not shown), an instruction pointer register (not shown) containing an instruction pointer, and a prior instruction pointer register (not shown) containing a prior instruction pointer. The instruction pointer controls instruction fetching. CPU 12 automatically increments the instruction and prior instruction pointers to point to the next instruction to be executed and the instruction just executed respectively after executing an instruction.

CPU 12 also comprises logics (not shown) for executing a plurality of instructions. The instructions comprise a plurality of read I/O instructions and write I/O instructions. The write I/O instructions are not posted and execution of the next instruction is deferred by CPU 12 until the bus unit has finished writing. Each read/write I/O instruction comprises a plurality of I/O parameters. The I/O parameters are stored in the general purpose registers. The instructions, including the read/write I/O instructions, operate on either zero, one, or two operands. An operand either resides in the instruction, in a register or in a memory location. CPU 12 has two modes of operations, a real mode and a protected mode. The primary differences between the real mode and the protected mode is how a logical address is translated into a linear address, the size of the address space, and paging capability.

Additionally, CPU 12 comprises logics (not shown) for executing a plurality of hardware interrupts. Hardware interrupts occur as the result of an external event and are classified into two types: maskable and nonmaskable. Interrupts are serviced after execution of the current instruction. After the interrupt service routine is finished with servicing the interrupt, execution proceeds with the instruction immediately after the interrupted instruction. Maskable interrupts are typically used to respond to asynchronous external hardware events. Unmaskable interrupts are typically used to service very high priority events.

For further description relating to the registers and internal structure of CPU 12, see *i386 TM SX Microprocessor*, published by Intel Corporation as publication number 240187, and related publications.

GENIO includes parallel ports (PIO) 22, dual serial ports (SIO) 24a, 24b, real time clock unit (RTC) 26, dual programmable interrupt controllers (PIC) 28a, 28b, dual programmable timers (PIT) 30a, 30b, and dual direct memory access controllers (DMA) 32a, 32b. GENVGA includes VGA graphics controller 36, video memory controller 38 and interface 40 for a flat panel display unit.

Additionally, external to the three main components are system memory 44, cache memory 46, video memory 48, and an interface (PAL/DAC) 50 for a conventional VGA monitor. The system memory 44, the cache memory 46 and video memory 48 are accessed by the memory controller 14, cache memory controller 16 and video memory controller 38 respectively. The video memory 48 may also be accessed through the ISA bus 42, and the two interfaces 40, 50.

For further description relating to the "i386 TM SX" Microprocessor, see *i386 TM SX Microprocessor Hardware Reference Manual*, published by Intel Corporation as publication number 240332, and related publications.

Transparent System Interrupt with Automated I/O Trap Restart

The present invention is implemented by means of three enhancements to a conventional prior art microprocessor architecture, for example, the assignee's "i386 TM" architecture, as follows:

1. A new interrupt called the System Supervisor interrupt (SSI) for superseding the entire microprocessor system's protection mechanism with specific support for superseding the protection mechanism while the CPU is executing an I/O instruction. The SSI interrupt is non-maskable and has a higher priority than all other interrupts, including other non-maskable interrupt. The SSI interrupt is serviced by a SSI interrupt service routine.

2. A special system transparent memory area referred to as System Management RAM or SMRAM for storing the SSI interrupt service routine, the state of the CPU at the time it was interrupted, and an I/O trap indicator. The I/O trap indicator indicating whether the CPU was interrupted during execution of an I/O instruction. The SMRAM may be located on on-board memory or off-board memory coupled to an on-board controller.

3. A new instruction, called RESUME, for returning the microprocessor system to the state just before it was interrupted by an SSI interrupt and resuming execution at the next instruction or automatically re-executing the interrupted I/O instruction.

Figure 2:
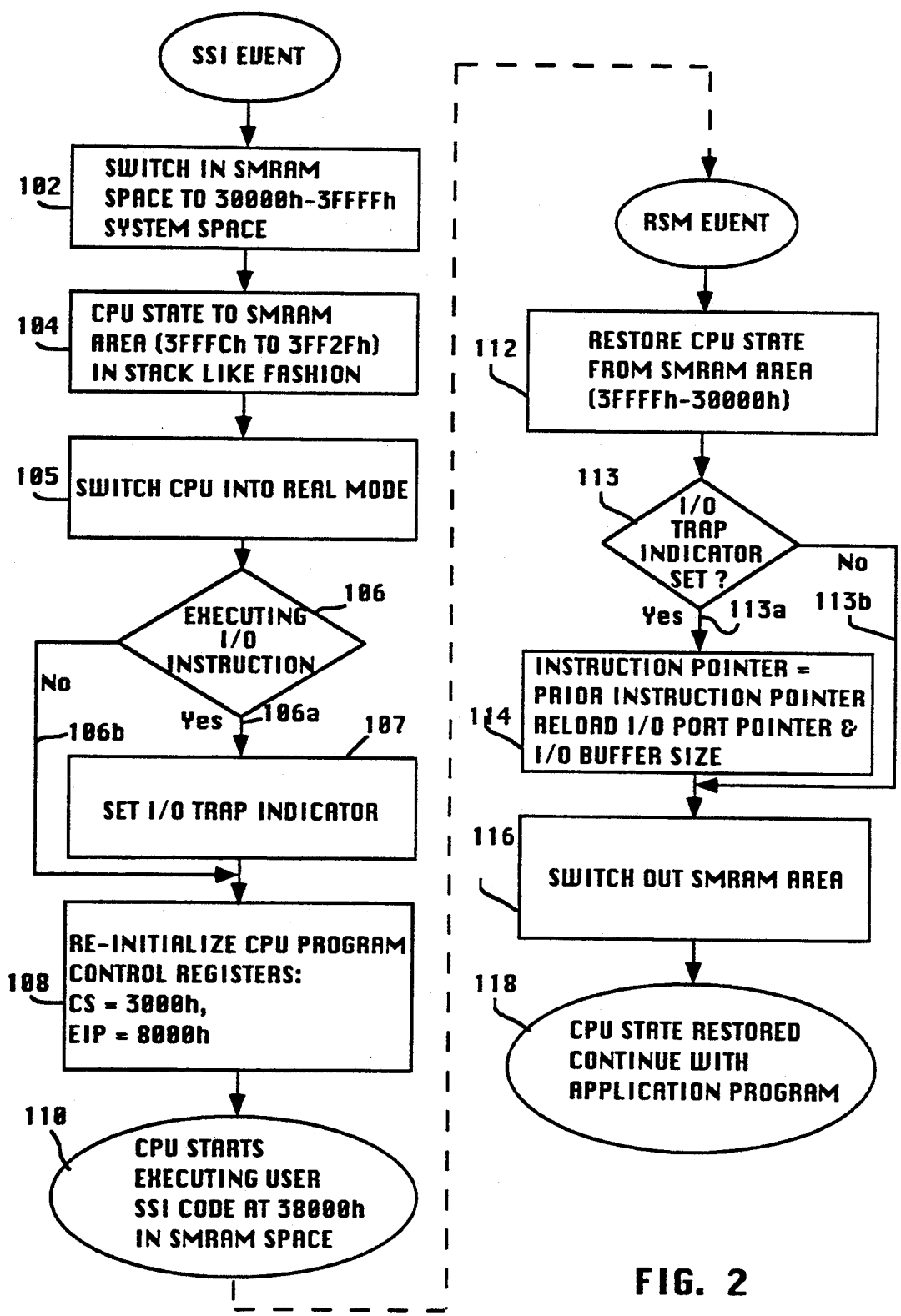
FIG. 2 is a functional flow diagram of the microcode for the transparent system interrupt with automated I/O trap restart of the present invention.

Referring now to FIG. 2, a flow chart illustrating the microcode of the SSI interrupt of the present invention is shown. A SSI interrupt is invoked by the assertion of an electrical signal at an external pin of the CPU chip. Upon detection of the electrical signal at the external pin of the CPU chip (SSI event), the CPU maps the SMRAM as a pre-determined area of main memory space, block 102. The SMRAM is normally not mapped as part of the main memory space, thereby making it inaccessible to the operating system and the applications. Additionally, the CPU saves the CPU state into the SMRAM space, block 104, switches the CPU into real mode, block 106, re-initializes the CPU's program control registers, block 108, and starts execution of the SSI interrupt service routine, block 110.

The CPU state saved comprises the instruction pointer, the prior instruction pointer, the I/O parameter registers. The SSI interrupt service routine sets an I/O trap indicator in the dedicated RAM space, if the CPU is being interrupted during execution of an I/O instruction and the interrupt service routine wants the interrupted I/O instruction to be restarted when execution resumes. The SSI interrupt service routine typically comprises instructions that are unique to a particular application of the SSI interrupt to the system in which the CPU chip is installed.

Recovery from the SSI interrupt is accomplished upon recognition of an external event that invokes the "Resume" instruction (RSM event). Upon detection of the external event, the CPU restores the CPU state stored in the SMRAM area, block 112, checks to determine if the I/O trap indicator is set, block 113. If the I/O trap indicator is set, branch 113a, the CPU decrements the instruction pointer to the prior instruction pointer, block 114. Additionally, the I/O parameter registers are restored to the values before the interrupt occurred.

If the I/O trap indicator is not set, branch 113b, or upon decrementing the instruction pointer to the prior instruction pointer, block 115, the CPU switches out the SMRAM area and unmaps it as part of the main memory space, block 116, and continues execution of the interrupted operating system or application program, block 117. Therefore, if the I/O trap indicator is set upon returning from the system interrupt service routine, the interrupted I/O instruction gets re-executed. However, if the I/O trap indicator is not set upon returning from the system interrupt service routine, the next instruction gets executed.

Except saving the instruction and prior instruction pointers, saving the I/O parameter registers, checking the I/O trap indicator, decrementing the instruction pointer and conditionally restoring the I/O parameter registers, these enhancement, including a specific application of the SSI interrupt, the power management interrupt (PMI), are described in detail in the above identified U.S. patent which is hereby fully incorporated by reference.

While the method of the present invention has been described in terms of its presently preferred form, those skilled in the art will recognize that the method of the present invention is not limited to the presently preferred form described. The method of the present invention may be practiced with modification and alteration within the spirit and scope of the appended claims. The specifications and drawings are, accordingly, to be regarded in an illustrative rather than a restrictive sense.

What is claimed is:

1. An improved microprocessor system comprising a central processing unit (CPU) coupled to at least one memory unit and at least one bus unit for executing an operating system and at least one application program comprising a plurality of said CPU's instructions, said CPU further having at least two modes of program execution, a real mode and a protected mode, and at least one interrupt for interrupting program execution, wherein the improvement to said microprocessor system comprises:

(a) said CPU waiting until said at least one bus unit has finished executing a write input-output (I/O) instruction before executing a next instruction, said CPU instructions comprising at least one I/O instruction including said write I/O instruction;

(b) said memory units having a dedicated memory area for storing an interrupt processing program, processor state data of said CPU, and an I/O trap indicator, said dedicated memory area being not mapped as part of main memory space thereby keeping said dedicated memory area inaccessible to said operating system and application programs, (c) means in response to said interrupt processing program for determining if said CPU is being interrupted during one of said I/O instructions and conditionally setting said I/O trap indicator to indicate said CPU being interrupted during one of said I/O instructions and said interrupted I/O instruction is to be restarted when said CPU resumes execution;

(d) register means comprising an instruction pointer, a prior instruction pointer, and at least one I/O parameter, said instruction and prior instruction pointers pointing to a first and second instructions of said operating system and application programs' instructions, said first instruction being an instruction to be executed next by said CPU, said second instruction being an instruction just executed by said CPU, said at least one I/O parameter being associated with the most recently executed I/O instruction;

said I/O trap indicator indicating whether said CPU is interrupted during execution of one of said I/O instructions;

(e) System Supervisor Interrupt (SSI) means for interrupting execution of said operating system and said application programs, switching in and mapping said dedicated memory area to a pre-determined segment of said main memory space, storing said processor state data of said CPU into said dedicated memory area, switching said CPU into said real mode of execution, and starting execution of said interrupt processing program, said SSI being unmaskable by said operating system and said application programs, and having a higher priority than other interrupts;

(f) Resume means for restoring said saved processor state data from said dedicated memory area to said CPU, checking said I/O trap indicator to determine if it is set, conditionally decrementing said restored instruction pointer to said restored prior instruction pointer if said I/O trap indicator is set, loading said restored at least one I/O parameter into at least one general purpose register of said CPU, switching out and unmapping said dedicated memory area to said main memory space, and resuming execution of said operating system and said application programs;

thereby allowing said CPU to be interrupted reliably and automated I/O trap restart be provided to said interrupt service program in a manner transparent to said operating system and said application programs.

2. The improved microprocessor system as set forth in claim 1, wherein said memory units comprises on-board random access memory (RAM), and said dedicated memory area is part of said on-board RAM.

3. The improved microprocessor system as set forth in claim 1, wherein said memory units comprises off-board RAM coupled to an on-board RAM controller, and said dedicated memory area is part of said off-board RAM.

4. The improved microprocessor system as set forth in claim 1, wherein said CPU comprises interrupt means for triggering said interrupts including said SSI, said SSI being triggered upon receipt of an electrical signal, said interrupt means comprising an interface for receiving said electrical signal.

5. The improved microprocessor system as set forth in claim 4, wherein said interface is an external circuit pin.

6. The improved microprocessor system as set forth in claim 4, wherein said microprocessor system further comprises an event detection means coupled to at least one system asset of said microprocessor system and said interrupt means for detecting a pre-determined event associated with said system asset and generating for said interface said electrical signal upon said detection.

7. The improved microprocessor system as set forth in claim 1, wherein said CPU comprises instruction means for executing said instructions including said I/O instructions and said Resume instruction.

8. In a microprocessor system comprising a central processing unit (CPU) coupled to at least one memory unit and a bus unit for executing an operating system and at least one application program comprising a plurality of said CPU's instructions, said CPU further having at least two modes of program execution, a real mode and a protected mode, and at least one interrupt for interrupting program execution, a method for reliably interrupting said CPU and providing automated I/O trap restart in a manner transparent to said operating system and application programs comprising the steps of:

(a) storing an interrupt processing program in a dedicated memory area on said memory units, said dedicated memory area being not mapped as part of main memory space thereby keeping said dedicated memory area inaccessible to said operating system and application programs;

(b) waiting until said at least one bus unit has finished executing an write input-output (I/O) instruction before executing a next instruction, said instructions comprising at least one I/O instruction including said write I/O instruction:

(c) interrupting execution of said operating system and said application programs upon receipt of a pre-determined input, said interruption being unmaskable by said operating system and said application programs, and having a higher priority than other interruptions;

(d) switching in and mapping said dedicated memory area to a pre-determined segment of said main memory space;

(e) storing processor state data of said CPU into said dedicated memory area, said processor state data comprising an instruction pointer, a prior instruction pointer, and at least one I/O parameter register, said instruction and prior instruction pointers pointing to a first and second instructions of said operating system and application programs, said first instruction being an instruction to be executed next by said CPU, said second instruction being an instruction just executed by said CPU, said I/O parameter registers being associated with the most recently executed I/O instruction;

(f) switching said CPU into said real mode of execution;

(g) determining if said CPU is being interrupted during execution of one of said I/O instructions, and if said CPU is being interrupted during execution of one of said I/O instructions, and, said interrupted I/O instruction is to be re-executed when said CPU resumes execution, storing said I/O trap indicator in said dedicated memory area;

(h) starting execution of said interrupt processing program;

(i) restoring said saved processor state data, said restoration being controlled by said interrupt service program;

(j) determining if said saved I/O trap indicator is set, and if said saved I/O trap indicator is set, decrementing said restored instruction pointer to said restored prior instruction pointer, and restoring said I/O parameter registers;

(k) switching out and unmapping said dedicated memory area to said main memory space; and (l) resuming execution of said operating system and said application programs at the instruction pointed to by said instruction pointer.

9. The method as set forth in claim 8, wherein said memory units comprises on-board random access memory (RAM), and said dedicated memory area is part of said on-board RAM.

10. The method as set forth in claim 8, wherein said memory units comprises off-board RAM coupled to an on-board RAM controller, and said dedicated memory area is part of said off-board RAM.

11. The improved microprocessor system as set forth in claim 8, wherein said steps (c) through (h) are performed by interrupt means of said CPU upon receipt of an electrical signal, said interrupt means comprising an interface for receiving said electrical signal.

12. The method as set forth in claim 11, wherein said interface is an external circuit pin.

13. The method as set forth in claim 11, wherein said electrical signal being generated and provided to said interface by an event detection means coupled to at least one system asset of said microprocessor system and said interrupt means upon detection of a pre-determined event associated with said system asset.

14. The method as set forth in claim 11, wherein said steps (b) and steps (i) through (l) are performed by instruction means of said CPU.

* * * * *

UNITED STATES PATENT AND TRADEMARK OFFICE
CERTIFICATE OF CORRECTION

PATENT NO. : 5,274,826  
DATED : December 28, 1993  
INVENTOR(S) : James Kardach, et al It is certified that error appears in the above-indentified patent and that said Letters Patent is hereby corrected as shown below:

IN THE DRAWINGS:
FIGURE 2, steps 108 and 110 should follow step 105 and precede steps 106 and 107.

Column 1, line 33, please change the punctuation "period" after the word "patent" to a punctuation "comma".

Column 6, line 53, please change "said memory units" to --said memory unit--.

Column 7, line 17, after "said application programs", please insert --through generation of a SSI.--

Column 7, lines 17 - 18, please delete "switching and mapping", and insert thereto -- causing--.

Column 7, line 18, after "said dedicated memory area", please insert --to be switched in and mapped--.

UNITED STATES PATENT AND TRADEMARK OFFICE
CERTIFICATE OF CORRECTION

PATENT NO. : 5,274,826
DATED : December 28, 1993
INVENTOR(S) : James Kardach, et la It is certified that error appears in the above-indentified patent and that said Letters Patent is hereby corrected as shown below:

Column 7, line 35, please delete "switching out and unmapping", and insert thereto -- causing--.

Column 7, line 36, after "memory area", please insert thereto --to be switched out and unmapped--.

Signed and Sealed this

Twentieth Day of September, 1994

BRUCE LEHMAN

Attest:

Attesting Officer

Commissioner of Patents and Trademarks